(12) United States Patent
Liu

(10) Patent No.: US 8,991,715 B2
(45) Date of Patent: Mar. 31, 2015

(54) PROTECTION HOUSING FOR RFID TAG

(75) Inventor: Zhijia Liu, Shanghai (CN)

(73) Assignee: Shanghai Yaochuan Information Technology Co., Ltd., Shanghai (CN)

(*) Notice: Subject to any disclaimer, the term of this patent is extended or adjusted under 35 U.S.C. 154(b) by 0 days.

(21) Appl. No.: 14/123,447

(22) PCT Filed: Jun. 1, 2012

(86) PCT No.: PCT/CN2012/076385
§ 371 (c)(1),
(2), (4) Date: Apr. 16, 2014

(87) PCT Pub. No.: WO2012/163292
PCT Pub. Date: Dec. 6, 2012

(65) Prior Publication Data
US 2014/0224884 A1    Aug. 14, 2014

(30) Foreign Application Priority Data
Jun. 2, 2011    (CN) .......................... 2011 1 0148059

(51) Int. Cl.
*G06K 19/00* (2006.01)
*G06K 19/077* (2006.01)

(52) U.S. Cl.
CPC ........ *G06K 19/07728* (2013.01); *G06K 19/077* (2013.01); *G06K 19/07749* (2013.01); *G06K 19/0773* (2013.01)
USPC .......................................... 235/492; 235/487

(58) Field of Classification Search
USPC ................................................ 235/487, 492
See application file for complete search history.

(56) References Cited

U.S. PATENT DOCUMENTS

| | | | | |
|---|---|---|---|---|
| 5,973,599 | A * | 10/1999 | Nicholson et al. | ......... 340/572.8 |
| 2013/0057390 | A1 * | 3/2013 | Watt et al. | .................... 340/10.1 |

FOREIGN PATENT DOCUMENTS

| | | |
|---|---|---|
| CN | 1543304 A | 11/2004 |
| CN | 1936931 A | 3/2007 |
| CN | 202102473 U | 1/2012 |

OTHER PUBLICATIONS

English Translation of International Search Report from PCT/CN2012/076385; dated Sep. 6, 2012.

*Primary Examiner* — Matthew Mikels
(74) *Attorney, Agent, or Firm* — Baker & Hostetler LLP

(57) ABSTRACT

A protection housing for an RFID tag, including a first housing and a second housing and an encapsulation structure for encapsulating an RFID tag into the placement space formed by the first housing and the second housing, the first housing having a first extension part including at least one air conductive groove, an elastic body, and at least one first air conductive through hole. The air conductive groove has a cavity and an opening; the elastic body matches the shape of the air conductive groove and is inserted into the cavity of each air conductive groove and forms an elastic snap-fitted part therewith; and the first air conductive through hole is placed on a sidewall where the placement space is adjacent to the elastic snap-fitted part, with one end thereof being in communication with the placement space and the other end being in contact with the elastic body. When the air pressure in the placement space is higher than atmospheric pressure and reaches a pre-set threshold, the high pressure air presses the elastic body that is inserted in the air conductive groove from the first air conductive through hole to force the elastic snap-fitted part of the elastic body to form an air conductive duct after being pressed by the air pressure, thus the high pressure air is discharged out via the air conductive duct and the opening of the air conductive groove. The present invention enables the encapsulation product of the RFID tag to be resistant to high temperature and to meet the IP68 protection standard.

10 Claims, 3 Drawing Sheets

PROTECTION HOUSING FOR RFID TAG

CROSS-REFERENCE TO RELATED APPLICATIONS

This application is a National Stage of International Patent Application No. PCT/CN2012/076385, filed Jun. 1, 2012 and claims priority to foreign application CN 201110148059.1, filed Jun. 2, 2011, the content of which are incorporated herein by reference in their entirety.

FIELD OF THE INVENTION

The present invention relates to an RFID (Radio Frequency Identification) tag product, specifically to protection housing for an RFID tag.

BACKGROUND OF THE INVENTION

RFID is a non-contact automatic identification technology, which identifies target object automatically through the radio frequency signal and acquires related data. The identification does not need human intervention, this technology has advantages including quick and convenient operation, long service life, long reading distance and large capacity of data storage; besides, the data on the tag can be encrypted and the information stored can also be changed conveniently.

As a data carrier, the electronic tag can be used for identifier recognition, article tracking and information acquisition. At home and abroad, the electronic tag has been used widely applied to many fields. The RFID system formed by an electronic tag, a reader-writer, an antenna and application software is connected directly with the relevant information management system. Every article can be tracked accurately, and this kind of information management system can bring many benefits to customers, including real-time data acquisition, safe data access channel and acquisition of all product information in offline state. Therefore, the RFID technology has been widely applied to many fields like industrial and commercial automation.

In order to enable RFID tag to work in highly humid severe environment of dust pollution, the tag chip and antenna are arranged in the protection space formed by housing structure for placing tag, thus to reach a certain protection level standard; for example, IP68 (ingress protection 68) standard protection level. The American patent US 2010/0259393A1 discloses an RFID tag structure, in which the RFID tag is placed in a capsule type space formed by two shells. The above structure realizes good improvement on waterproof and dustproof property of the RFID tag. Moreover, in actual use, a waterproof sealing rubber is used to seal and strengthen the joint part of the two shells.

However, when the RFID tag with waterproof hermitic housing is placed in a high-temperature serve environment, temperature of the air inside the external housing raises, which causes expansion of the air and generation of big tension, so the air pressure in the housing is higher than that of the air outside the housing; specifically when the temperature outside of the housing is higher than 300° C., (for example, on the paint spraying line of automobile production, temperature of housing of the RFID tag to record process information and process operation information), if the pressure inside cannot be eliminated, it is easy to deform the two housings with waterproof sealing structure, and even crack the structure; as a result, the RFID tag placed in the space formed by the encapsulation structure of two housings can be damaged.

Therefore, in consideration of application of RFID tag in special environment, for example, management and tracking of automobile industry, and oil & gas, the RFID tag product that can resist super high temperature (higher than 250° C.) and meet the IP68 protection standard.

SUMMARY OF THE INVENTION

The present invention aims to provide a protection housing of an RFID tag, so as to solve the problem that the RFID tag encapsulation housing in the present technology cannot meet IP68 standard and high temperature resistance, thus the tag can have better endurance to serve environment.

To achieve the above object, the present invention has the technical scheme is as follows:

A protection housing for an RFID tag, including a first housing, a second housing and an encapsulation structure for encapsulating an RFID tag into the placement space formed by the first housing and the second housing; wherein the first housing has a first extension part that extends outwards; and the protection housing further includes at least one air conductive groove, an elastic body, and at least one first air conductive through hole. Wherein the air conductive groove is provided in the first extension part and includes a cavity and an opening; Wherein the elastic body, which matches the shape of the air conductive groove and is inserted into the cavity of each air conductive groove and forms an elastic snap-fitted part with the cavity of the air conductive groove; wherein the first air conductive through hole, which is placed on a sidewall where the placement space is adjacent to the elastic snap-fitted part, with one end thereof being in communication with the placement space and the other end being in contact with the elastic body; wherein, when the air pressure in the placement space is higher than atmospheric pressure and reaches a preset threshold, the high pressure air presses the elastic body that is inserted in the air conductive groove from the first air conductive through hole to force the elastic snap-fitted part of the elastic body to form an air conductive duct after being pressed by the air pressure, thus the high pressure air is discharged out via the air conductive duct and the opening of the air conductive groove.

The protection housing for an RFID tag of the present invention, preferably, wherein the second housing has a second extension part that extends outwards; and the second extension part includes a cavity used to seal the air conductive groove opening and at least one second air conductive through hole located on the cavity; the cavity is located on and completely covered hermetically on the air conductive groove, and the second air conductive through hole is located over the elastic body; Wherein, when the air pressure in the placement space is higher than atmospheric pressure and reaches a preset threshold, the high pressure air is discharged out via the first air conductive through hole, the air conductive duct, the opening of the air conductive groove, and the second air conductive through hole.

The protection housing for an RFID tag of the present invention, preferably, wherein the second air conductive through hole is a circular through hole.

The protection housing for an RFID tag of the present invention, preferably, wherein the opening area of the second air conductive through hole corresponding to the elastic body is greater than opening area of the other end of the second air conductive through hole.

The protection housing for an RFID tag of the present invention, preferably, wherein the second air conductive through hole is a conical through hole.

The protection housing for an RFID tag of the present invention, preferably, wherein the first air conductive through hole is located at the central area of the sidewall.

The protection housing for an RFID tag of the present invention, preferably, wherein the shape of the air conductive groove section is rectangle, triangle or trapezoid.

The protection housing for an RFID tag of the present invention, preferably, wherein the material of the elastic body is silicon or polyamide.

The protection housing for an RFID tag of the present invention, preferably, wherein the air conductive groove is an integral sealed waterproof groove around the RFID tag, with multiple first air conductive through holes uniformly distributed on the sidewall.

The protection housing for an RFID tag of the present invention, preferably, wherein the air conductive groove is an integral sealed waterproof groove around the RFID tag, the cavity of the second extension part is annular and located on and completely covered hermetically on the air conductive groove; and multiple second air conductive through holes are uniformly distributed in the annular cavity.

The present invention can be used in the environment of high temperature (for example, the temperature of the environment is higher than 250° C.), high humid and dust pollution. At one hand, after waterproof hermitic encapsulation of the first housing and the second housing, the IP68 standard is met; at the other hand, the sealed encapsulation structure can also be used for normally working in high temperature environment of higher than 250° C. for more than 6 hours continuously.

That is to say, the present invention solves the problem that the encapsulation structure of some current RFID tag cannot meet IP68 waterproof standard and high temperature resistance performance at the same time. When the waterproof sealing performance of the protection housing is guaranteed, even if the air pressure inside the placement space is higher than the atmosphere pressure and reaches the preset threshold, the high pressure air in the protection housing can be discharged through the specially designed channel, which avoids damaging RFID tag in the hermitic space.

DESCRIPTION OF CURRENT EMBODIMENTS

The following is detailed description of the preferred embodiments of the present invention in combination with the drawings.

Figure 1:
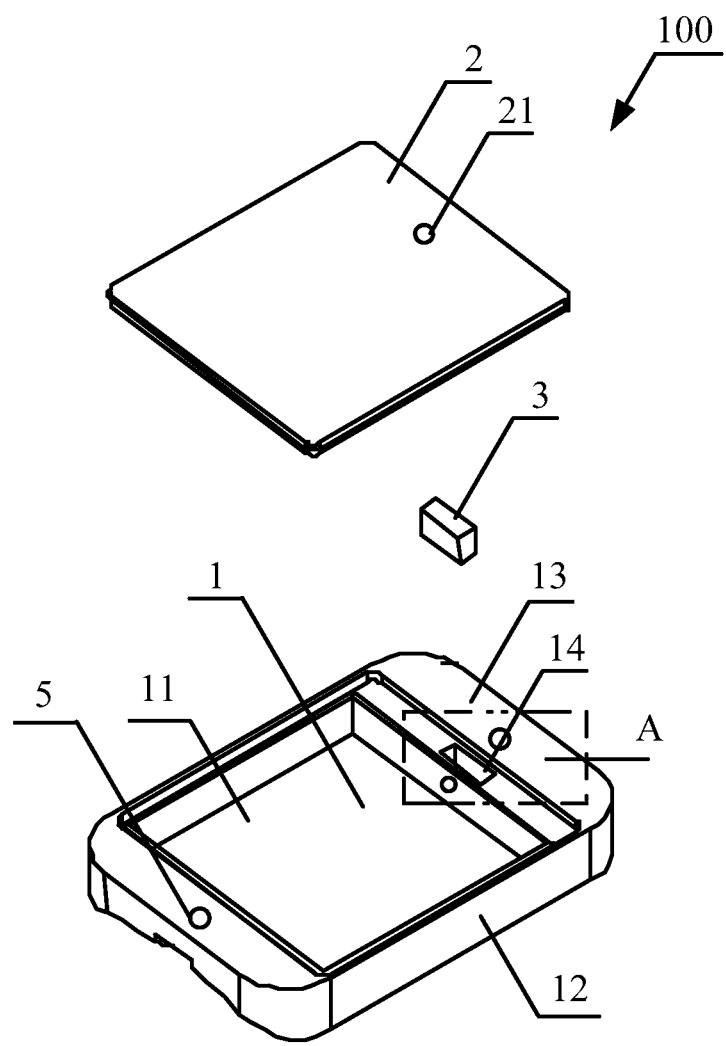
FIG. 1 is the space exploded diagram of a preferred embodiment of the protection housing of an RFID tag of the present invention.

As shown in FIG. 1, the protection housing 100 of the RFID tag includes a first housing 1, a second housing 2 and an encapsulation structure that is used to encapsulate the RFID tag (not shown in the figure) into the RFID placement space formed by the first housing 1 and the second housing 2. Generally, the RFID tag is fixed in the placement space formed by the first housing 1 and the second housing 2 in any manner, for example, it is glued on the first housing 1 or the second housing 2. The through hole 5 in the figure is the mounting hole.

The RFID tag can be passive tag or active tag that can actively send a signal of certain frequency.

In this embodiment, the material of the first housing 1 and the second housing 2 can resist high temperature of 250° C. For example, nylon (polyamide) is a preferred material. Nylon has good comprehensive performance, including mechanical property, heat resistance, abrasion resistance, chemical resistance and self-lubricating property, as well as low coefficient of friction, certain flame retardant property and easy processing.

The encapsulation structure can be realized by any commonly used method of the technician of this field. For example, groove snap-fit sealing structure can be adopted, when the first housing 1 and the second housing 2 is snap-fitted and sealed, it can also be sealed with waterproof glue; besides, the waterproof sealing method of ultrasonic welding can also be used.

Figure 2:
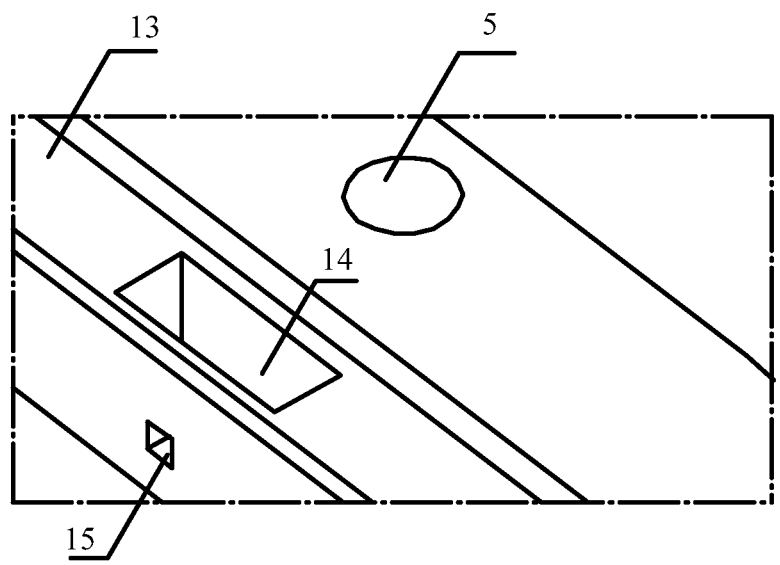
FIG. 2 is the enlarged schematic diagram of the zone A part of the first housing of the embodiment as shown in FIG. 1.
Figure 3:
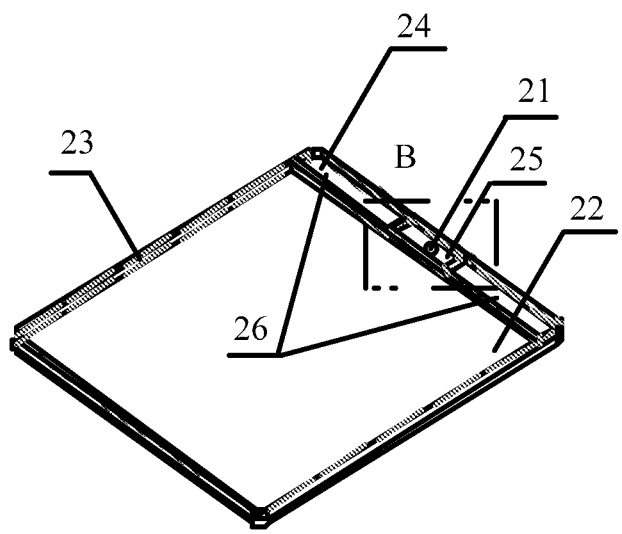
FIG. 3 is the schematic diagram of the second housing in the protection housing of the RFID tag of the present invention.
Figure 4:
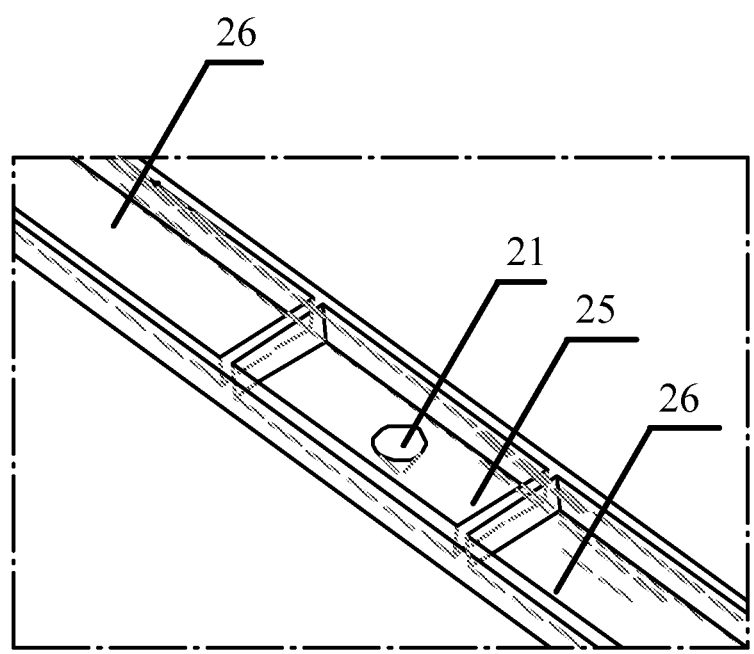
FIG. 4 is the enlarged schematic diagram of the zone B part of the second housing of the embodiment as shown in FIG. 3.

The following is further detailed description of the preferred embodiment of the protection structure 100 of the RFID tag in combination with FIG. 2 to FIG. 4.

As shown in FIG. 1, the first housing 1 includes a bottom part 11 and a wall 12 extending upwards from the bottom part 11, wherein the wall 12 of first housing 1 includes a first extension part 13 that extends outwards from the wall 12. The second housing 2 includes a top part 22 and a wall 23 that extends downwards from the bottom part. The first housing 1 and the second housing 2 form the hermitic structure though close integration of the wall 12 and the wall 23.

As shown in FIG. 2, in the first extension part 13, at least one air conductive groove 14 can be arranged. In this embodiment, only one air conductive groove 14 is provided. The air conductive groove 14 includes a cavity and an opening, and section of the air conductive groove 14 is rectangular, triangular or trapezoidal.

An elastic body 3 is inserted in the cavity of the air conductive groove 14 which matches with the elastic body 3 in shape, and the elastic body 3 forms an elastic snap-fit part with cavity of the air conductive groove 14. Generally, the elastic snap-fit part prevents the humid air outside from entering the placement space formed by the first housing 1 and the second housing 2. The material of the elastic body 3 is silicon or polyamide. The elastic coefficient of the elastic body 3 is can be selected according to the preset threshold, wherein the preset threshold unit is unit of intensity of pressure (for example, Pa).

The first extension part 13 can include at least one first air conductive through hole 15 which is located on the sidewall where the placement space is adjacent to the elastic snap-fitted part; preferably, the first air conductive through hole 15 is located on the central area of the sidewall. One end of the first air conductive through hole 15 is in communication with the placement space and the other end is in contact with the elastic body. When the air pressure in the placement space is higher than atmospheric pressure and reaches a preset threshold, the high pressure air presses the elastic body 3 that is inserted in the air conductive groove 14 from the first air conductive through hole 15 to force the elastic snap-fitted part of the elastic body 3 to form an air conductive duct after being pressed by the air pressure, thus the high pressure air is discharged out via the air conductive duct and the opening of the air conductive groove 14.

Another preferred embodiment of the present invention is as follows: the second housing 2 includes a top part 22 and a wall 23 that extends downwards from the bottom part, and the second housing 2 includes a second extension part 24 that extends outwards from the wall 23. The second extension part 24 includes a cavity 25 used to seal opening of the air conductive groove 14 and a second air conductive through hole 21 located on the cavity; the cavity 25 is located on and completely covered on the air conductive groove 14, and the second air conductive through hole 21 is located over the elastic body 3.

When the air pressure in the placement space is higher than atmospheric pressure and reaches a preset threshold, the high pressure air is pressed out through the first air conductive through hole 15 to force the elastic snap-fitted part to form an air conductive duct, and then discharged out through the air conductive duct, the opening of the air conductive groove 14, and the second air conductive through hole 21.

The second air conductive through hole 21 can be in any shape; for example, the second air conductive through hole 21 is a circular through hole. Preferably, the second air conductive through hole 21 is a conical through hole; wherein radius of the end of the second air conductive through hole 21 corresponding to the elastic body 3 is greater than that of the other end of the second air conductive through hole 21.

In humid environment, water drops or water vapor enter the air conductive groove 14 through the second air conductive through hole 21; however, because the elastic body 3 seals the first air conductive through hole 15 at the elastic snap-fitted part, if water pressure and water vapor protection level specified by IP68 protection level is not exceeded, the water pressure presses the elastic body 3 such that the elastic body 3 blocks the first air conductive through hole 15 more tightly, the water drops or water vapor cannot enter the tag placement space formed by the first housing 1 and the second housing 2, thus to protect the RFID tag from being corroded.

In the preferred embodiments as shown in FIG. 1-FIG. 4, the first housing 1 and the second housing 2 encapsulate the RFID tag by a snap-fitted sealing structure in the placement space formed by the first housing 1 and the second housing 2. The placement space can be of any shape; in the figure, the space is rectangular.

The snap-fitted sealing structure includes a waterproof groove that is arranged on the wall 12 of the first housing 1 and a tenon that is arranged on the wall 23 of the second housing 2. In some special embodiments, the tenon can be directly arranged on the top part 22 of the second housing 2 (for example, the top part 22 is a flat plate), namely the wall 23 is omitted.

At least one air conductive groove 14 (one groove as shown in the figure) can be arranged in the waterproof groove of the first housing 1. The air conductive groove 14 includes a cavity and an opening. Similarly, shape of the elastic body 3 matches that of the air conductive groove 14, and the elastic body 3 is inserted in the cavity of the air conductive groove 14 and forms an elastic snap-fitted part therewith.

The placement space formed by the first housing 1 and the second housing 2 and the space formed with the air conductive groove 14 are separated by the sidewall of the placement space adjacent to the elastic snap-fitted part. The first air conductive through hole 15 is arranged on the sidewall. Similarly, one end of the first air conductive through hole 15 is in communication with the placement space, and the other end is in contact with the elastic body 3.

Referring to FIG. 3 and FIG. 4, the second extension part 24 of the second housing 2, except the rectangular cavity 25 and the second air conductive through hole 21 on the cavity 25, further includes an auxiliary cavity 26. Similarly, the cavity 25 is located on and completely covered and sealed on the air conductive groove 14, and the second air conductive through hole 21 is located over the elastic body 3.

When the air pressure in the placement space is higher than atmospheric pressure and reaches a preset threshold, the high pressure air forces the elastic snap-fitted part to form an air conductive duct, and then is discharged out through the first air conductive through hole 15, the air conductive duct, the opening of the air conductive groove 14, and the second air conductive through hole 21.

In another preferred embodiment, the air conductive groove 14 of the first housing 1 is a hermitic waterproof groove around the whole RFID; similarly, the elastic body 3 matches the shape of the air conductive groove 14. Therefore, the elastic body 3 is an annular structure, and forms an elastic snap-fitted part with the cavity of the air conductive groove 14.

Multiple first air conductive through holes 15 can be arranged on the sidewall of the placement space adjacent to the elastic snap-fitted part. Similarly, one end of the first air conductive through hole is in communication with the placement space, and the other end is in contact with the elastic body. Preferably, the first air conductive through hole 15 includes a group of first air conductive holes that are uniformly distributed on the sidewall.

In this embodiment, the second extension part of the second housing 2 is the whole annular cavity 25 and located on and covered and sealed on the air conductive groove 14, and the second air conductive through hole 21 is located over the elastic body 3. The second air conductive through hole 21 can be a group of through holes uniformly distributed on the annular cavity 25.

When the air pressure in the RFID tag placement space is higher than atmospheric pressure and reaches a preset threshold, the high pressure air is pressed out through the first air conductive through hole 15 to force the elastic snap-fitted part to form an air conductive duct, and then discharged out through the air conductive duct, the opening of the air conductive groove 14, and the second air conductive through hole 21.

The technician of this field shall be aware that any change and modification to the present invention within the scope and spirit of the present invention as disclosed in the claims of the present invention shall belong to the protection scope of the claims of the present invention.

The invention claimed is:

1. A protection housing for an RFID tag, including a first housing, a second housing and an encapsulation structure for encapsulating an RFID tag into the placement space formed by the first housing and the second housing; wherein the first housing has a first extension part that extends outwards;

and the protection housing further includes:

at least one air conductive groove, which is provided in the first extension part and includes a cavity and an opening;

an elastic body, which matches the shape of the air conductive groove and is inserted into the cavity of each air conductive groove and forms an elastic snap-fitted part with the cavity of the air conductive groove;

and at least one first air conductive through hole, which is placed on a sidewall where the placement space is adjacent to the elastic snap-fitted part, with one end thereof being in communication with the placement space and the other end being in contact with the elastic body;

wherein, when the air pressure in the placement space is higher than atmospheric pressure and reaches a preset threshold, the high pressure air presses the elastic body that is inserted in the air conductive groove from the first air conductive through hole to force the elastic snap-fitted part of the elastic body to form an air conductive duct after being pressed by the air pressure, thus the high pressure air is discharged out via the air conductive duct and the opening of the air conductive groove.

2. The protection housing for an RFID tag according to claim 1, wherein the second housing has a second extension part that extends outwards; and the second extension part includes a cavity used to seal the air conductive groove opening and at least one second air conductive through hole located on the cavity; the cavity is located on and completely covered hermetically on the air conductive groove, and the second air conductive through hole is located over the elastic body;

Wherein, when the air pressure in the placement space is higher than atmospheric pressure and reaches a preset threshold, the high pressure air is discharged out via the first air conductive through hole, the air conductive duct, the opening of the air conductive groove, and the second air conductive through hole.

3. The protection housing for an RFID tag according to claim 2, wherein the second air conductive through hole is a circular through hole.

4. The protection housing for an RFID tag according to claim 2, wherein the opening area of the second air conductive through hole corresponding to the elastic body is larger than opening area of the other end of the second air conductive through hole.

5. The protection housing for an RFID tag according to claim 4, wherein the second air conductive through hole is a conical through hole.

6. The protection housing for an RFID tag according to claim 1, wherein the first air conductive through hole is located at the central area of the sidewall.

7. The protection housing for an RFID tag according to claim 1, wherein the shape of the air conductive groove section is rectangle, triangle or trapezoid.

8. The protection housing for an RFID tag according to claim 1, wherein the material of the elastic body is silicon or polyamide.

9. The protection housing for an RFID tag according to claim 1, wherein the air conductive groove is an integral sealed waterproof groove around the RFID tag, with multiple first air conductive through holes uniformly distributed on the sidewall.

10. The protection housing for an RFID tag according to claim 2, wherein the air conductive groove is an integral sealed waterproof groove around the RFID tag, the cavity of the second extension part is annular and located on and completely covered hermetically on the air conductive groove; and multiple second air conductive through holes are uniformly distributed in the annular cavity.

* * * * *